United States Patent [19]

Shinohara

[11] Patent Number: 5,785,597
[45] Date of Patent: Jul. 28, 1998

[54] GAME MACHINE AND REPEATER THEREFOR

[75] Inventor: Satoshi Shinohara, Kanagawa, Japan

[73] Assignee: Sony Corporation, Tokyo, Japan

[21] Appl. No.: 583,623

[22] Filed: Jan. 5, 1996

[30] Foreign Application Priority Data

Jan. 17, 1995 [JP] Japan ................... 7-022227

[51] Int. Cl.⁶ .................................. G06F 13/14
[52] U.S. Cl. ........................................ 463/43
[58] Field of Search .................... 463/40, 42, 43;
364/514 A; 395/200.08, 200.09

[56] References Cited

U.S. PATENT DOCUMENTS

| | | |
|---|---|---|
| 4,588,187 | 5/1986 | Dell . |
| 5,442,771 | 8/1995 | Filepp et al. ............ 395/200.09 |
| 5,581,479 | 12/1996 | McLaughlin et al. ......... 364/514 A |

FOREIGN PATENT DOCUMENTS

| | | |
|---|---|---|
| A-208319 | 1/1987 | European Pat. Off. . |
| A-2185607 | 7/1987 | United Kingdom . |
| WO-A-8808167 | 10/1988 | WIPO . |

*Primary Examiner*—George Manuel
*Attorney, Agent, or Firm*—Frommer Lawrence & Haug LLP; William S. Frommer

[57] ABSTRACT

The invention provides a game machine and a repeater therefor wherein, even when individual data of operation terminal equipments are to be stored, there is no necessity of re-connecting an external storage apparatus for each of the operation terminal equipments and a sufficient capacity is assured for the storage capacity which can be used for each one operation terminal equipment. The game machine includes a game machine body, a repeater, a pair of operation terminal equipments, and a pair of external storage apparatus. The repeater includes a body-connectable transmission-reception section for connecting the repeater to the game machine body, a pair of terminal equipment-connectable transmission-reception sections for connecting the operation terminal equipments to the repeater, a pair of storage apparatus-connectable transmission-reception sections for connecting the external storage apparatus to the repeater, and a control circuit. The external storage apparatus are provided in a one-by-one corresponding relationship to the operation terminal equipments such that individual data of the operation terminal equipments may be stored into the external storage apparatus, respectively.

19 Claims, 9 Drawing Sheets

GAME MACHINE AND REPEATER THEREFOR

BACKGROUND OF THE INVENTION

1. Field of the Invention

This invention relates to a game machine such as a video game machine for home use or for individual use and a repeater for use with the game machine.

2. Description of the Related Art

A conventional video game machine for home use or for individual use typically includes an operation terminal equipment such as a control pad connected to a game machine body. An external storage apparatus such as a memory card, which has stored in advance or stores various data regarding operation environment of the operation terminal equipment and process data during playing of a game, is connected to the game machine body.

Another video game machine by which a game can be enjoyed by a plurality of players at a time has been developed and put on the market recently. In the video game machine, an operation terminal equipment is not directly connected to a game machine body, but a repeater is connected to the game machine body. To the repeater, a plurality of operation terminal devices can be simultaneously connected.

However, in the conventional game machine of the type just described wherein a plurality of operation terminal devices can be simultaneously connected to a game machine body via a repeater, an external storage apparatus is directly connected to game machine body. Consequently, in order to record individual data of the operation terminal devices into the external storage apparatus, the external storage apparatus connected to the game machine body must be replaced with another external storage apparatus each time it is intended to store data of a different operation terminal device connected to the game machine body via the repeater. Accordingly, cumbersome operations are required when a plurality of players enjoy a game simultaneously using the conventional game machine.

However, it is also possible for an external storage apparatus connected to a game machine body to be utilized separately or commonly by a plurality of operation terminal devices to store individual data of the operation terminal devices into the external storage apparatus.

In this instance, however, the capacity of the external storage apparatus which can be used per one operation terminal device is limited. When the capacity is insufficient, another external storage apparatus must be re-connected.

Further, in this instance, since the external storage apparatus is utilized in units of a plurality of operation terminal devices, the operation terminal devices to be connected to the repeater are limited to operation terminals which are compatible with the external storage apparatus. Accordingly, it is impossible for only some operations to be replaced.

SUMMARY OF THE INVENTION

It is an object of the present invention to provide a game machine and a repeater therefor wherein, even when individual data of operation terminal devices are to be stored, there is no necessity of re-connecting an external storage apparatus for each of the operation terminal device and a sufficient capacity is assured for the storage capacity which can be used for each operation terminal device.

In order to attain the object described above, according to an aspect of the present invention, there is provided a repeater for a game machine, which comprises an operation terminal equipment-connectable transmission-reception section for transmitting and receiving data to and from a plurality of operation terminal devices, an external storage apparatus-connectable transmission-reception section for transmitting and receiving data to and from a plurality of external storage device corresponding to the plurality of operation terminal devices, a game machine-connectable transmission-reception section for serially transmitting and receiving data to and from a game machine body, and control means for selectively connecting the game machine-connectable transmission-reception section to the operation terminal equipment-connectable transmission-reception section or the external storage apparatus-connectable transmission-reception section.

Another to another aspect of the present invention, there is provided a game system, which comprises a game machine body having an operation terminal equipment-connectable connection section, and a repeater connectable to the operation terminal equipment-connectable connection section by serial communication and allowing connection thereto of a plurality of operation terminal devices and a plurality of external storage devices individually corresponding to the plurality Of operation terminal devices by serial communication, the repeater including control means for selectively connecting the plurality of operation terminal devices and the plurality of external storage devices connected thereto to the game machine body.

In the game machine and the repeater for the game machine of the present invention having the constructions described above, a plurality of external storage devices can be simultaneously connected to the repeater. Consequently, for example, by connecting a plurality of external storage devices in a one-to-one corresponding relationship to a plurality of operation terminal devices connected to the repeater so that individual data of the operation terminal devices may be stored into the respective external storage device, any external storage apparatus need not be re-connected for any of the operation terminal devices connected to the repeater. Further, a sufficient capacity can be assured for the capacity of an external storage apparatus which can be used for each operation terminal device.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
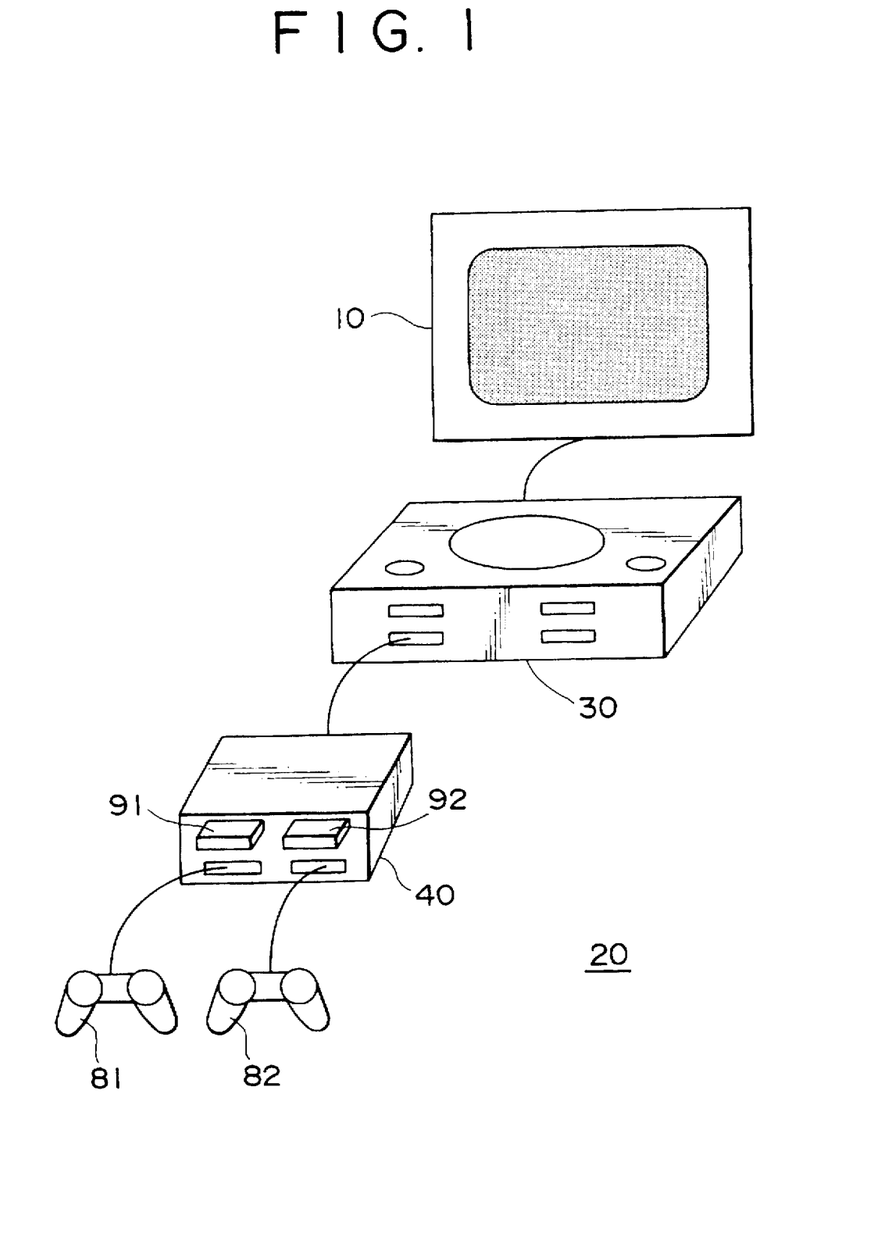
FIG. 1 is a schematic view showing a game machine system in which a game machine and a repeater for the game machine according to the present invention are incorporated.

Referring first to FIG. 1, there is shown a game machine system in which a game machine according to the present invention is incorporated. The game machine system includes a video audio outputting apparatus 10 such as a television receiver, and a game machine 20 connected to the video audio outputting apparatus 10. The game machine 20 includes a game machine body 30 connected to the video audio outputting apparatus 10, and a repeater 40 connected to the game machine body 30. A pair of operation terminals 81 and 82 can be simultaneously connected to the repeater 40, and also a pair of external storage devices 91 and 92 can be simultaneously connected to the repeater 40. The external storage devices 91 and 92 are, for example, memory cards.

The operation terminals 81 and the external storage device 91, and the operation terminal 82 and the external storage device 92, have connection sections individually disposed in a juxtaposed relationship at upper and lower stages so that the corresponding relationship among them can be identified readily.

Figure 2:
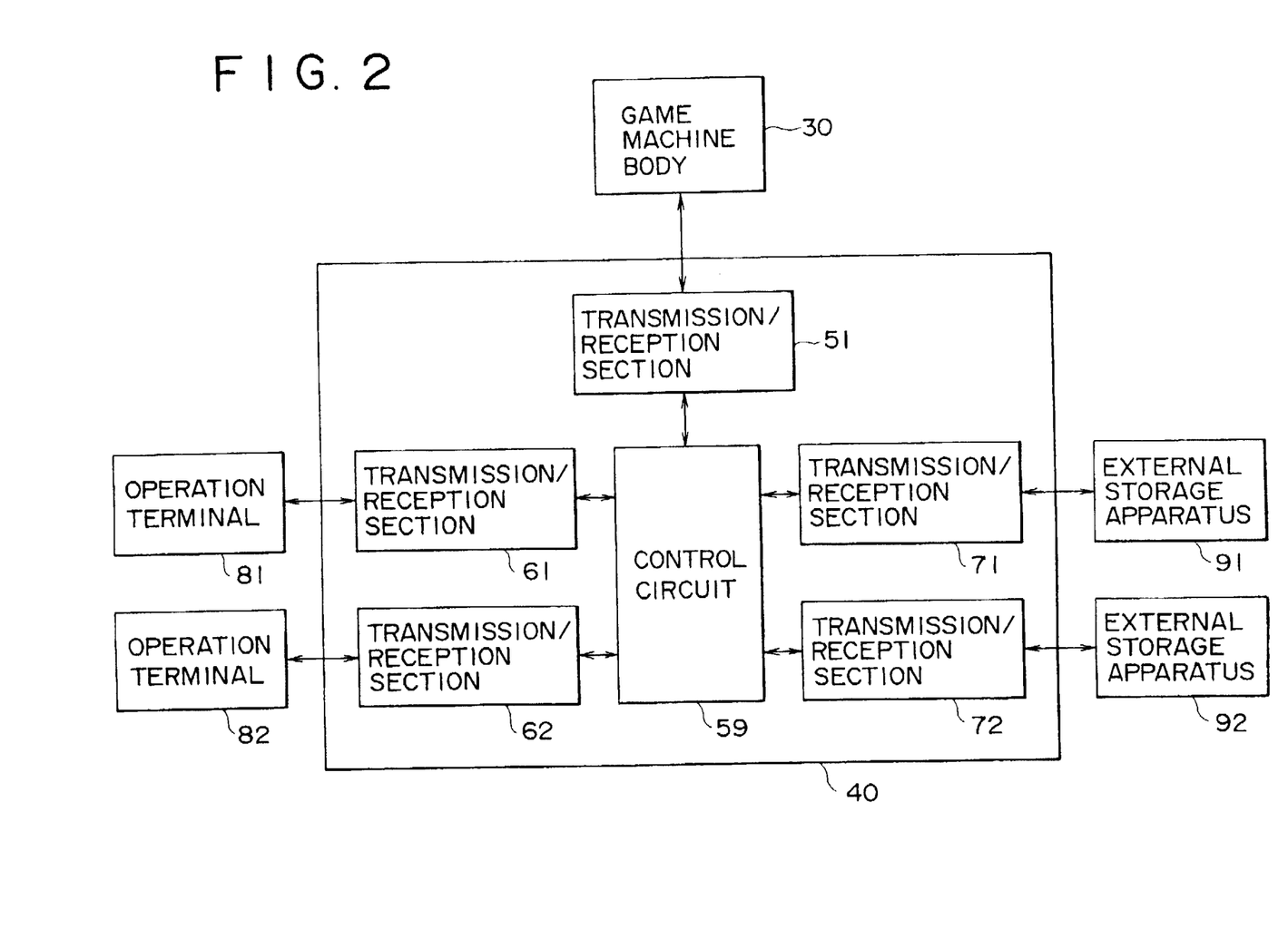
FIG. 2 is a functional block diagram of the game machine shown in FIG. 1.

Referring now to FIG. 2, the repeater 40 includes a body-connectable transmission-reception section 51, a pair of terminal equipment-connectable transmission-reception sections 61 and 62, a pair of storage apparatus-connectable transmission-reception sections 71 and 72, and a control circuit 59.

The body-connectable transmission-reception section 51 connects the repeater 40 to the game machine body 30 and communicates data with the game machine body 30 by serial communications. In the arrangement shown, the body-connectable transmission-reception section 51 is connected to a terminal equipment-connectable transmission-reception section (not shown) of the game machine body 30.

The terminal equipment-connectable transmission-reception sections 61 and 62 connect the operation terminals 81 and 82 to the repeater 40 and communicate data with the operation terminals 81 and 82 by serial communications, respectively.

The storage apparatus-connectable transmission-reception sections 71 and 72 connect the external storage devices 91 and 92 to the repeater 40 and communicate data with the external storage devices 91 and 92 by serial communications, respectively.

The control circuit 59 performs conversion and selection of data from and to the game machine body 30 connected to the body-connectable transmission-reception section 51, the operation terminals 81 and 82 connected to the terminal equipment-connectable transmission-reception sections 61 and 62, and the external storage devices 91 and 92 connected to the storage apparatus-connectable transmission-reception sections 71 and 72.

In particular, data from the operation terminals 81 and 82 are received by the terminal equipment-connectable transmission-reception sections 61 and 62 and undergo necessary conversion by the control circuit 59. Then, some of the data are stored into a buffer memory not shown. Further, the data from the operation terminals 81 and 82 are collectively transmitted from the body-connectable transmission-reception section 51 to the game machine body 30.

Data from the external storage devices 91 and 92 are received by the storage apparatus-connectable transmission-reception sections 71 and 72 and then undergo necessary conversion by the control circuit 59. Thereafter, they are transmitted from the body-connectable transmission-reception section 51 to the game machine body 30.

Data from the game machine body 30 intended for the operation terminals 81 and 82 are received by the body-connectable transmission-reception section 51 and undergo necessary conversion by the control circuit 59. Thereafter, data designated to be sent to the operation terminal 81 by the game machine body 30 are transmitted from the terminal equipment-connectable transmission-reception section 61 to the operation terminal 81. On the other hand, data designated to be sent to the operation terminal 82 are transmitted from the terminal equipment-connectable transmission-reception section 62 to the operation terminal 82.

Data from the game machine body 30 intended for the external storage devices 91 and 92 are received by the body-connectable transmission-reception section 51 and undergo necessary conversion by the control circuit 59. Then, data designated to be sent to the external storage device 91 by the game machine body 30 are transmitted from the storage apparatus-connectable transmission-reception section 71 to the external storage device 91. Meanwhile, data designated to be sent to the external storage device 92 by the game machine body 30 are transmitted from the storage apparatus-connectable transmission-reception section 72 to the external storage device 92.

In this instance, the external storage devices 91 and 92 connected to the storage apparatus-connectable transmission-reception sections 71 and 72 of the repeater 40 are provided in a one-to-one corresponding relationship to the operation terminals 81 and 82 connected to the terminal equipment-connectable transmission-reception sections 61 and 62 so that individual data of the operation terminals 81 and 82 are stored into the external storage devices 91 and 92, respectively.

Figure 3:
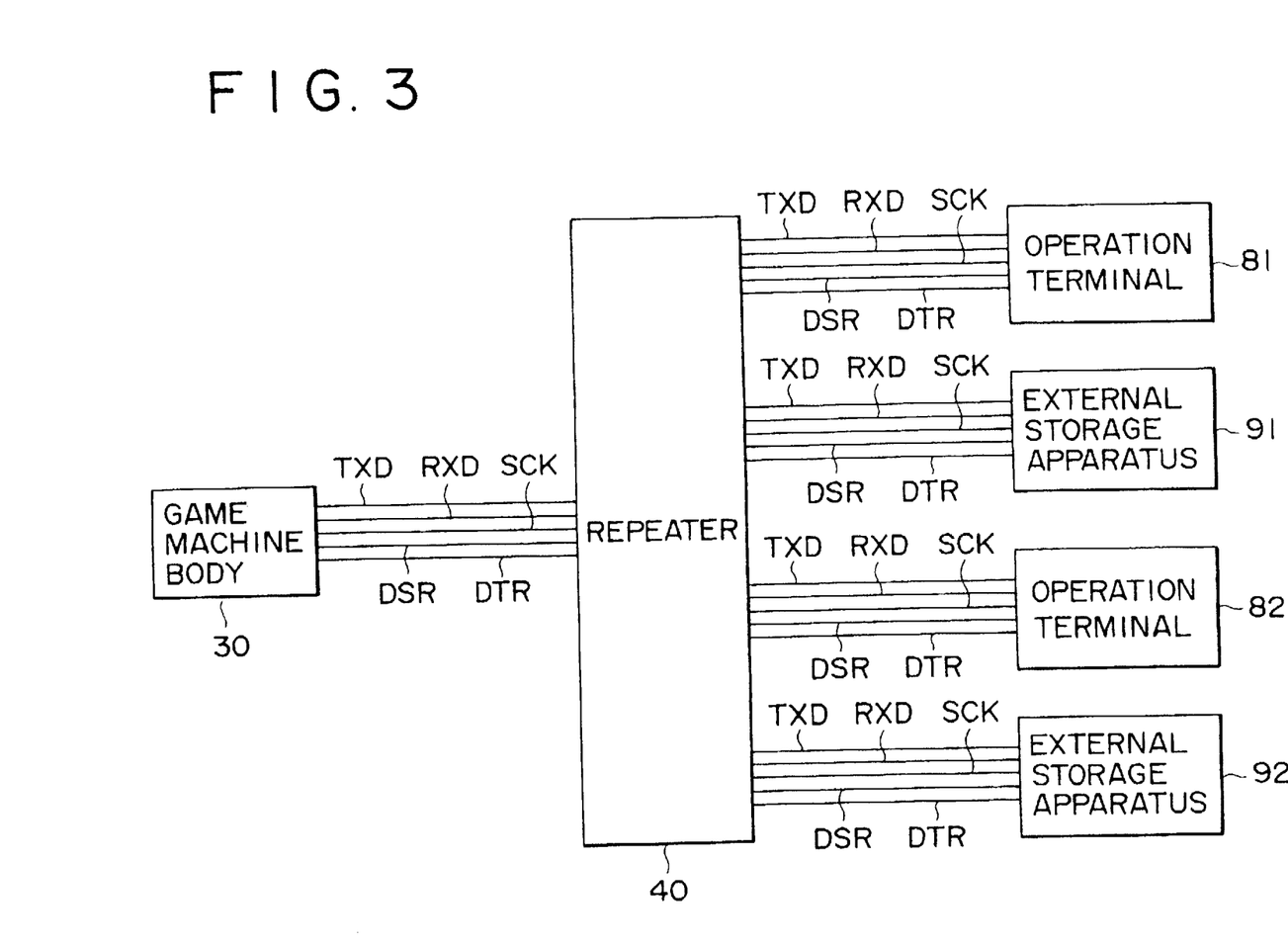
FIG. 3 is a block diagram illustrating signals and data communicated between a game machine body and operation terminal devices and external storage apparatus of the game machine system shown in FIG. 1.

Signals and data which are communicated between the game machine body 30 and the operation terminals 81 and 82 and external storage devices 91 and 92 via the repeater 40 are illustrated in FIG. 3. Referring to FIG. 3, the signals and data include a communications starting notification signal DTR transmitted from the game machine body 30 to the operation terminals 81 and 82 and the external storage devices 91 and 92, a starting acceptance signal DSR transmitted from the operation terminals 81 and 82 or the external storage devices 91 and 92 to the game machine body 30, transmission data TXD transmitted from the game machine body 30 to the operation terminals 81 and 82 and the external storage devices 91 and 92, transmission data RXD transmitted from the operation terminals 81 and 82 and the external storage devices 91 and 92 to the game machine body 30, and a serial clock signal SCK transmitted form the game machine body 30 to the operation terminals 81 and 82 and the external storage devices 91 and 92.

Figure 4:
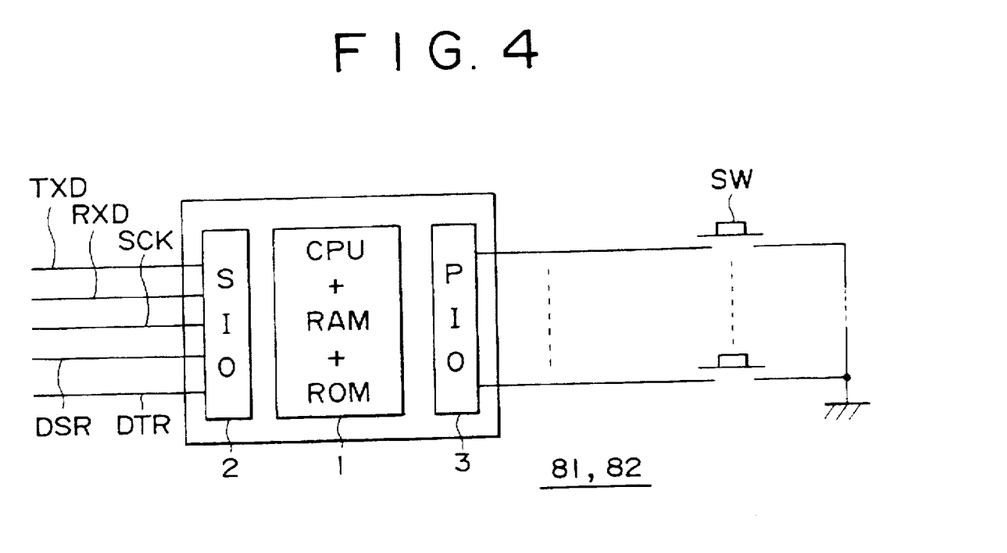
FIG. 4 is a functional block diagram showing an exemplary construction of the operation terminal devices shown in FIG. 1.

Referring now to FIG. 4, each of the operation terminals 81 and 82 includes a control section 1 formed from a CPU, a ROM in which a control program to be executed by the CPU and so forth are written, and a RAM used as a working area of the CPU. A serial I-O port 2 is provided on a side of the control section 1 which is connected to the repeater 40. Meanwhile, a parallel I-O port 3 is provided on the other side of the control section 1 which is connected to switches SW which form a manually operable elements of each of the operation terminals 81 and 82.

Figure 5:
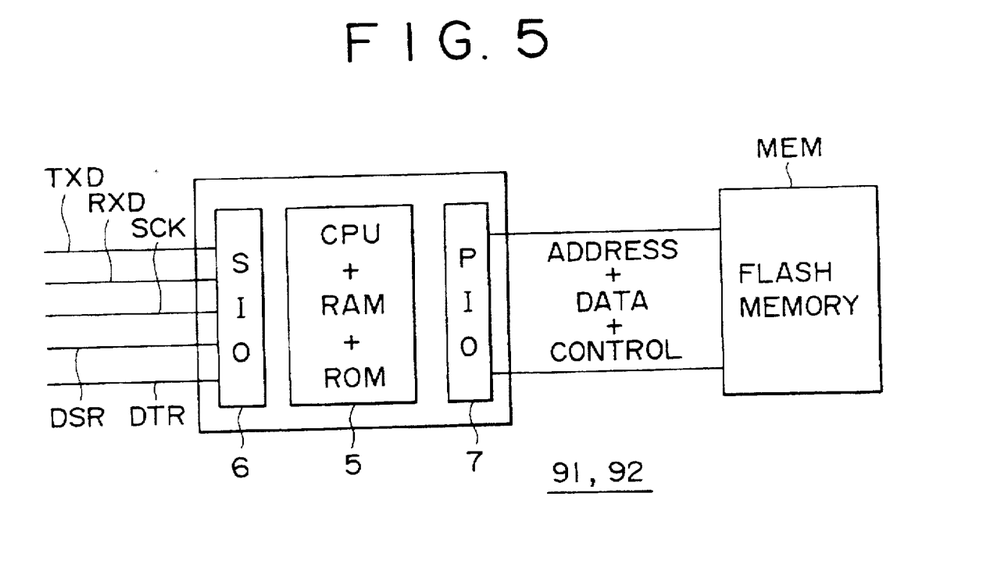
FIG. 5 is a similar view but showing an exemplary one of the external storage apparatus shown in FIG. 1.

Referring now to FIG. 5, each of the external storage devices 91 and 92 includes a control section 5 formed from a CPU, a ROM and a RAM. A serial I-O port 6 is provided on a side of the control section 5 connected to the repeater 40. Meanwhile, a parallel I-O port 7 is provided on the other side of the control section 5 and connected to a flash memory MEM which serves as a storage section of the external storage devices 91 or 92.

Communications between the game machine body 30 and the operation terminals 81 and 82 and external storage devices 91 and 92 in the example described above will be described in more detail with reference to FIGS. 1 to 6.

With respect to communications between the game machine body 30 and the operation terminals 81 and 82, a communications starting notification signal DTR of one bit is first transmitted from the game machine body 30 to the operation terminals 81 and 82 and the external storage devices 91 and 92 via the repeater 40. In response to the communications starting notification signal DTR, though not shown in FIG. 6, a starting acceptance signal DSR is transmitted from the operation terminals 81 and 82 or the external storage devices 91 and 92 to the game machine body 30 via the repeater 40. Then, the operation terminals 81 and 82 and the external storage devices 91 and 92 enter a reception waiting condition in which they wait reception of transmission data TXD from the game machine body 30.

Figure 6:
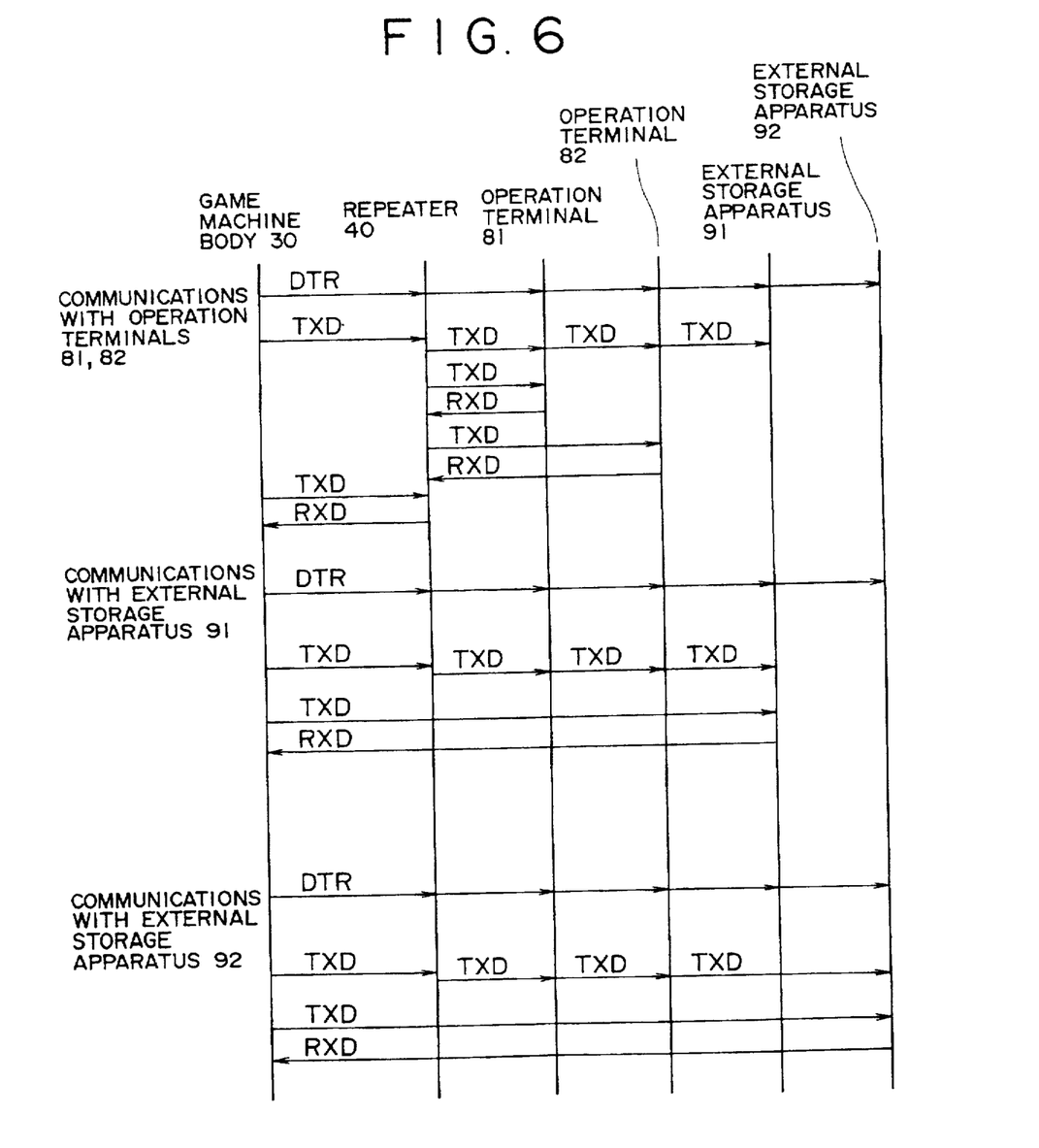
FIG. 6 is a diagram illustrating communications between the game machine body and the operation terminal devices and external storage apparatus shown in FIG. 1.

Then, transmission data TXD including an identification code of the operation terminals 81 and 82 is transmitted from the game machine body 30 to the repeater 40. The identification code is transmitted from the repeater 40 to the operation terminals 81 and 82 and the external storage devices 91 and 92. However, the external storage device 91 does not respond to succeeding transmission data TXD since the identification code is different from that of the external storage device 91, but only the operation terminals 81 and 82 start communications in response to reception of the identification code.

The transmission data TXD from the game machine body 30 to the operation terminals 81 and 82 are transmitted such that data to the operation terminal 81 and data to the operation terminal 82 are successively transmitted in order beginning with data to the operation terminal 81. Then, data to the operation terminal 81 are transmitted to the operation terminal 81 by the repeater 40 whereas data to the operation terminal 82 are transmitted to the operation terminal 82 by the repeater 40. Then, transmission data RXD are transmitted from the operation terminals 81 and 82 to the repeater 40. The repeater 40 adds different identification codes to the individual data from the operation terminals 81 and 82 included in the transmission data RXD. Then, after the transmission data TXD are transmitted from the game machine body 30 to the repeater 40, the transmission data RXD are transmitted from the repeater 40 to the game machine body 30. The transmission data RXD are obtained by collecting the data transmitted from the operation terminals 81 and 82 to the repeater 40 as a group.

Communications between the game machine body 30 and the external storage devices 91 and 92 are successively performed beginning with the external storage device 91. In particular, with respect to communications between the game machine body 30 and the external storage device 91, a communications starting notification signal DTR of one bit is first transmitted from the game machine body 30 to the operation terminals 81 and 82 and the external storage devices 91 and 92 via the repeater 40. In response to the communications starting notification signal DTR, though not shown in FIG. 6, a starting acceptance signal DSR is transmitted from the operation terminals 81 and 82 or the external storage devices 91 and 92 to the game machine body 30 via the repeater 40. Then, the operation terminals 81 and 82 and the external storage devices 91 and 92 enter a reception waiting condition for transmission data TXD from the game machine body 30.

Then, an identification code of the external storage apparatus is transmitted as transmission data TXD from the game machine body 30 via the repeater 40. The identification code is transmitted from the repeater 40 to the operation terminals 81 and 82 and the external storage device 91. However, since the operation terminals 81 and 82 have different identification codes from the received identification code, they do not respond to succeeding transmission data TXD, but only the external storage device 91 starts communications in response to reception of the identification code.

Then, the succeeding transmission data TXD are transmitted from the game machine body 30 to the external storage device 91 via the repeater 40. Then, transmission data RXD are transmitted from the external storage device 91 to the game machine body 30 via the repeater 40.

On the other hand, with respect to communications between the game machine body 30 and the external storage device 92, a communications starting notification signal DTR of one bit is first transmitted from the game machine body 30 to the operation terminals 81 and 82 and the external storage devices 91 and 92 via the repeater 40. In response to the communications starting notification signal DTR, though not shown in FIG. 6, a starting acceptance signal DSR is transmitted from the operation terminals 81 and 82 or the external storage devices 91 and 92 to the game machine body 30 via the repeater 40. Then, the operation terminals 81 and 82 and the external storage devices 91 and 92 enter a reception waiting condition for transmission data TXD from the game machine body 30.

Then, an identification code of the external storage apparatus is transmitted as transmission data TXD from the game machine body 30 to the repeater 40. The identification code is transmitted from the repeater 40 to the operation terminals 81 and 82 and the external storage device 92. However, since the operation terminals 81 and 82 have different identification codes from the received identification code, they do not respond to succeeding transmission data TXD, but only the external storage device 92 starts communications in response to reception of the identification code.

Then, the succeeding transmission data TXD are transmitted from the game machine body 30 to the external storage device 92 via the repeater 40. Then, transmission data RXD are transmitted from the external storage device 92 to the game machine body 30 via the repeater 40.

Figure 7A:
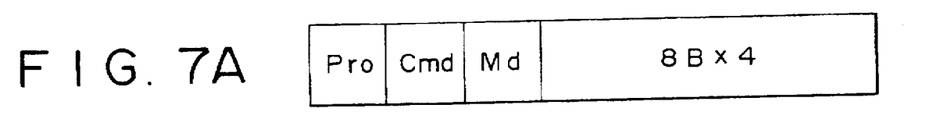
FIGS. 7A to 7D are diagrammatic views illustrating exemplary data communicated between the game machine body and the operation terminal devices and external storage apparatus shown in FIG. 1.
Figure 7B:
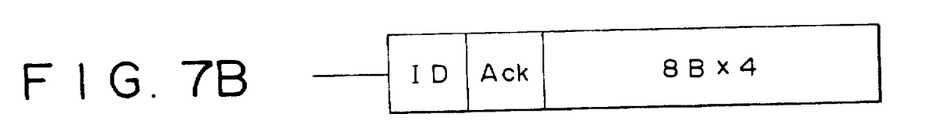

FIGS. 7A t 7D illustrate an exemplary construction of a data packet communicated between the game machine body 30 and the operation terminals 81 and 82 and external storage devices 91 and 92. FIG. 7A illustrates data to be transmitted from the game machine body 30 to the operation terminals 81 and 82. The data include a protocol Pro, a command Cmd and a mode Md followed by data of 8 bytes×4. An identification code of an operation terminal equipment is included in the protocol Pro. FIG. 7B illustrates data to be transmitted from the operation terminals 81 and 82 to the game machine body 30. The data include an identification code ID and an acknowledge Ack followed by data of 8 bytes×4.

Figure 7C:
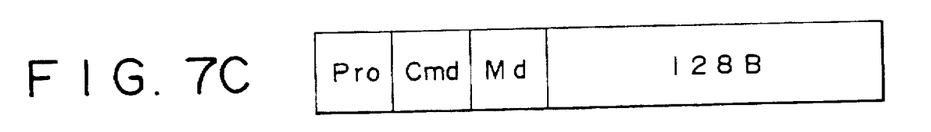
Figure 7D:
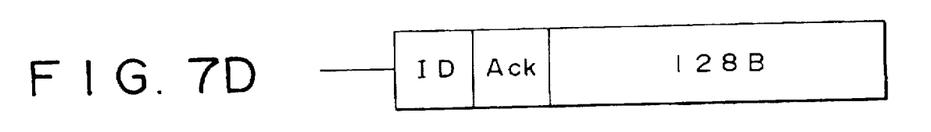

FIG. 7C illustrates data to be transmitted from the game machine body 30 to the external storage devices 91 and 92. The data include a protocol Pro, a command Cmd and a mode Md followed by data of 128 bytes. An identification code of an external storage apparatus is included in the protocol Pro. FIG. 7D illustrates data to be transmitted from the external storage devices 91 and 92 to the game machine body 30. The data include identification code ID and an acknowledge Ack followed by data of 128 bytes.

Figures 8A, 8B, 8C:
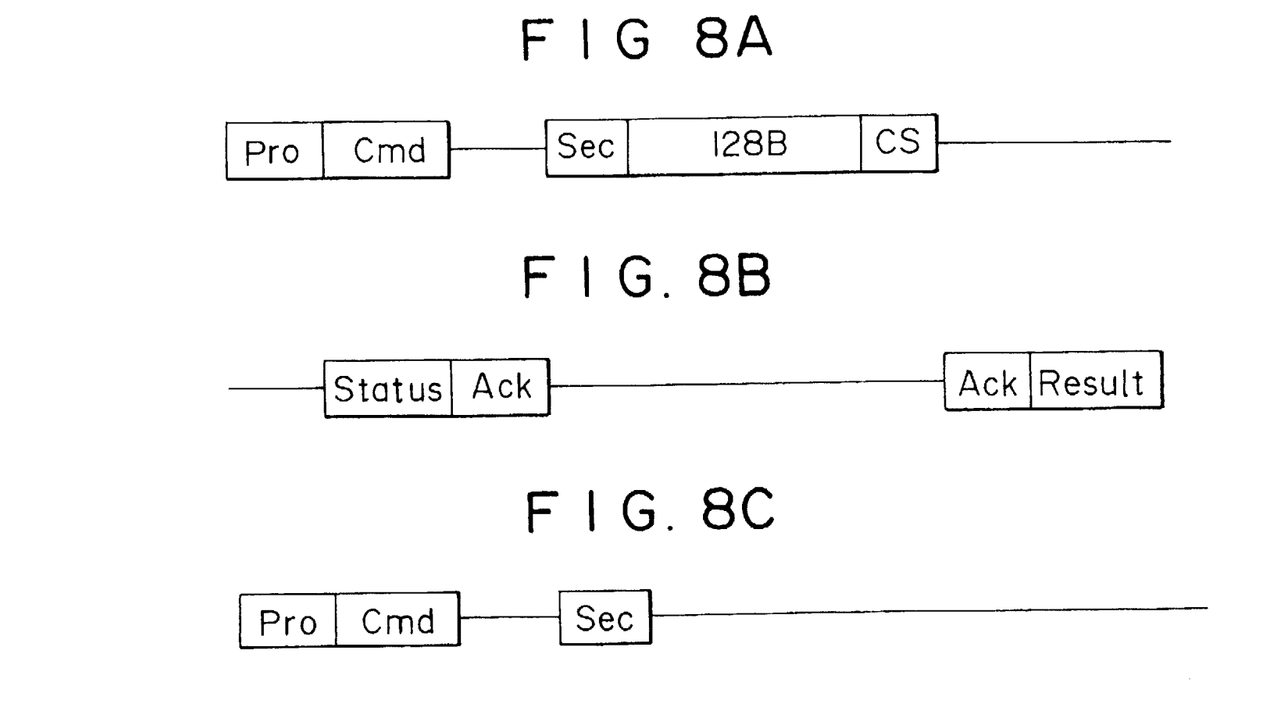
FIGS. 8A to 8D are diagrammatic views illustrating a communication procedure between the game machine body and the external storage apparatus shown in FIG. 1 by a packet.
Figure 8D:
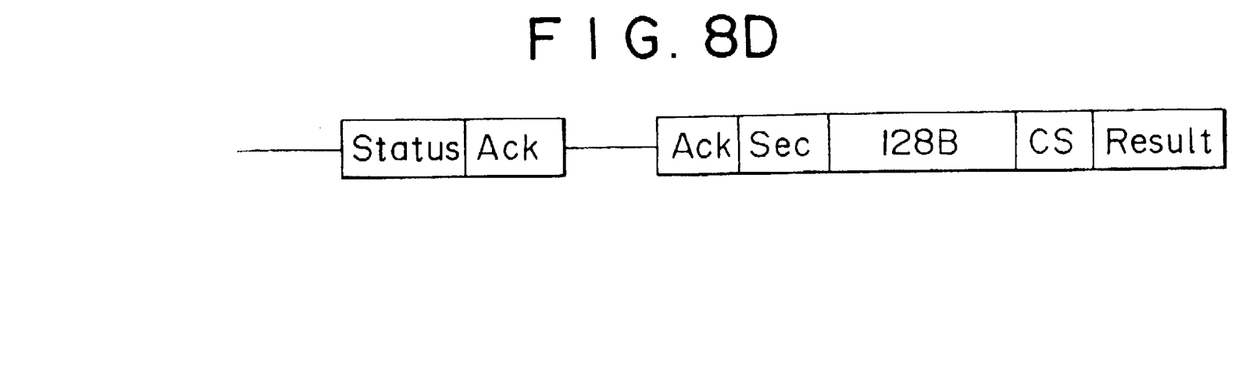

FIGS. 8A to 8D illustrate communication procedures between the game machine body 30 and the external storage 91 and 92 by a packet described above. In particular, FIG. 8A illustrates a procedure wherein packet data are transmitted from the game machine body 30 to the external storage devices 91 and 92 via the repeater 40. First a protocol Pro and a command Cmd are transmitted from the game machine body 30. The protocol Pro includes an identification code of the external storage apparatus, and the repeater 40 connects the external storage devices 91 and 92 corresponding to the identification code to the game machine body 30. Simultaneously with the transmission of the command Cmd, each of the external storage devices 91 and 92 transmits a status Status representing a status of the external storage devices 91 and 92 and an acknowledge Ack to the game machine body 30 as seen in FIG. 8B. Upon reception of the acknowledge Ack, the game machine body 30 sends out a sector Sec representing a storage position of RAMs in the external storage apparatus, data of 128 bytes and a check sum CS. The external storage devices 91 and 92 store the data to the storage position represented by the sector Sec. The external storage devices 91 and 92 receive the check sum CS transmitted thereto and transmit an acknowledge Ack and a transmission result Result. By the communication procedure described above, the data sent out from game machine body 30 are stored into the external storage devices 91 and 92.

FIG. 8C illustrates a procedure of transmitting data from the external storage devices 91 and 92 to the game machine body 30 via the repeater 40. First, a protocol Pro and a command Cmd are transmitted from the game machine body 30. An identification code of the external storage devices 91 and 92 is included in the protocol Pro, and the repeater 40 connects the external storage devices 91 and 92 corresponding to the identification code to the game machine body 30. Simultaneously when the command Cmd is transmitted, a status Status and an acknowledge Ack are transmitted from each of the external storage devices 91 and 92 to the game machine body 30 as shown from FIG. 8D. Upon reception of the acknowledge Ack, the game machine body 30 sends out a sector Sec indicating a storage position of the RAMs in the external storage apparatus. The external storage devices 91 and 92 receive the sector Sec transmitted thereto and transmit an acknowledge Ack, a sector Sec, data of 128 bytes, a check sum CS and a transmission result Result. By the communication procedure described above, the data stored in the storage position section Sec of the external storage apparatus are sent to the game machine body 30.

Figure 9A:
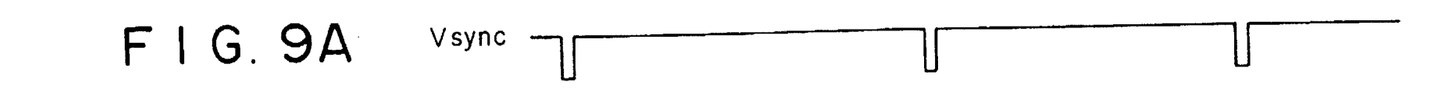
FIGS. 9A to 9E are time charts illustrating communication timings between the game machine body and the operation terminal devices and external storage apparatus shown in FIG. 1.
Figure 9B:
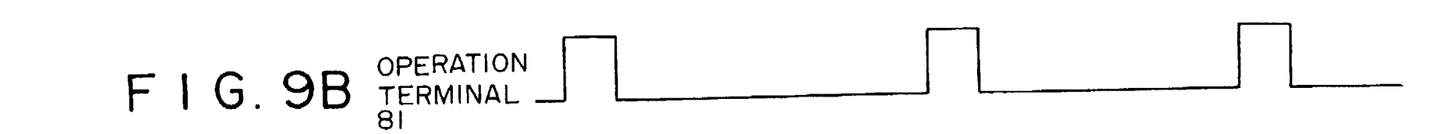
Figure 9C:
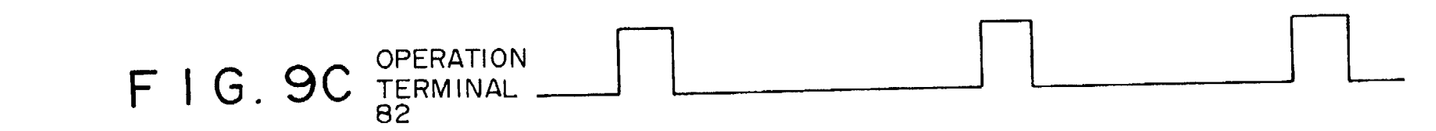

FIGS. 9A to 9E illustrate communication timings between the game machine body 30 and the operation terminals 81 and 82 and external storage devices 91 and 92. FIG. 9B illustrates a transmission timing of operation data from the operation terminal 81 to the game machine body 30. The game machine body 30 accepts transmission of operation data from the operation terminal 81 in response to a vertical synchronizing signal illustrated in FIG. 9A. FIG. 9C illustrates a transmission timing of operation data from the operation terminal 82 to the game machine body 30. Transmission of operation data from the operation terminal 82 is performed following the transmission of operation data from the operation terminal 81 to the game machine body 30. Also where three or more operation terminals are connected to the game machine body 30, transmission of operation data proceeds in a similar manner. In other words, data of all of the operation terminals are transmitted successively to the game machine body 30 within one vertical synchronization period.

Figure 9D:
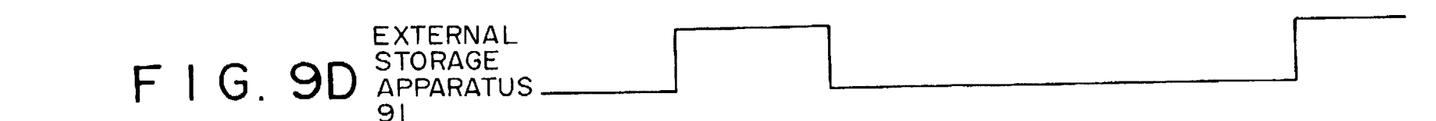
Figure 9E:
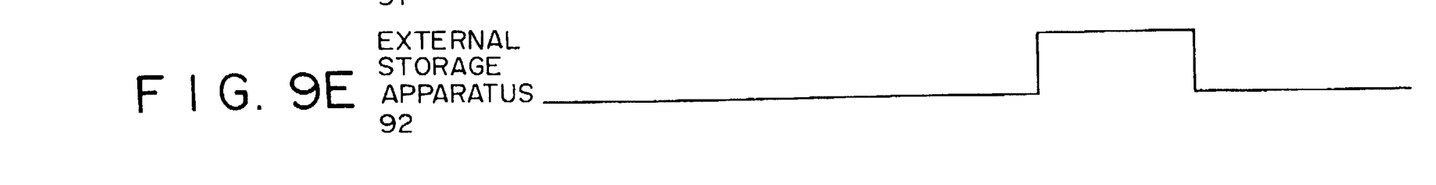

FIG. 9D illustrates a timing of data communication between the external storage device 91 and the game machine body 30. Communication of data between the external storage device 91 and the game machine body 30 is performed subsequently to the transmission of operation data from all of the operation terminals to the game machine body 30. Then, communication of data between the external storage device 92 and the game machine body 30 is performed in a next vertical synchronizing period as seen from FIG. 9E. In other words, communication between the external storage apparatus and the game machine body 30 is such that, within one vertical synchronizing period, the communication is performed between only one external storage device and the game machine body 30. When data to be transmitted or received by transmission operation exceed 128 bytes, communication of the data is performed over a plurality of vertical synchronizing periods. Further, the external storage device 91 and the external storage device 92 are normally communicated with the game machine body 30 alternately every other vertical synchronizing period.

With the game machine system described above, the two external storage devices 91 and 92 can be connected to the repeater 40 simultaneously and such two external storage devices 91 and 92 are provided in a one-to-one corresponding relationship to the two operation terminals 81 and 82 connected to the repeater 40 so that individual data of the operation terminals 81 and 82 are stored into the external storage devices 91 and 92, respectively. Consequently, there is no necessity of reconnecting an external storage apparatus for each operation terminal connected to the repeater 40, and a sufficient capacity can be assured for the storage capacity which can be used for each one operation terminal.

Figure 10:
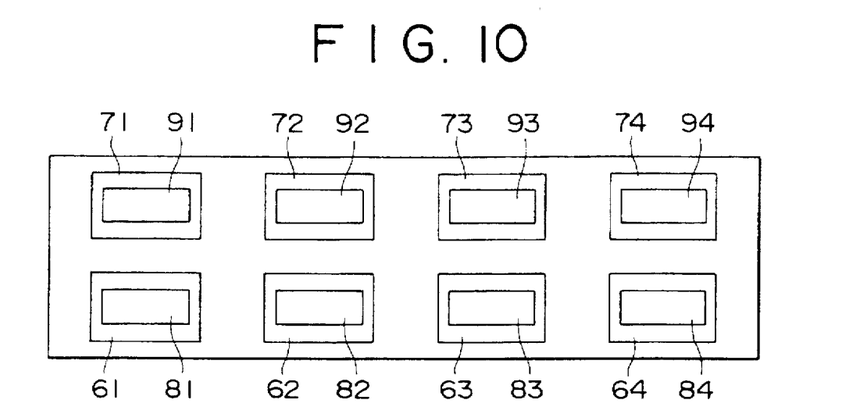
FIGS. 10 to 12 are diagrammatic view showing different constructions of the repeater shown in FIG. 1.
Figure 11:
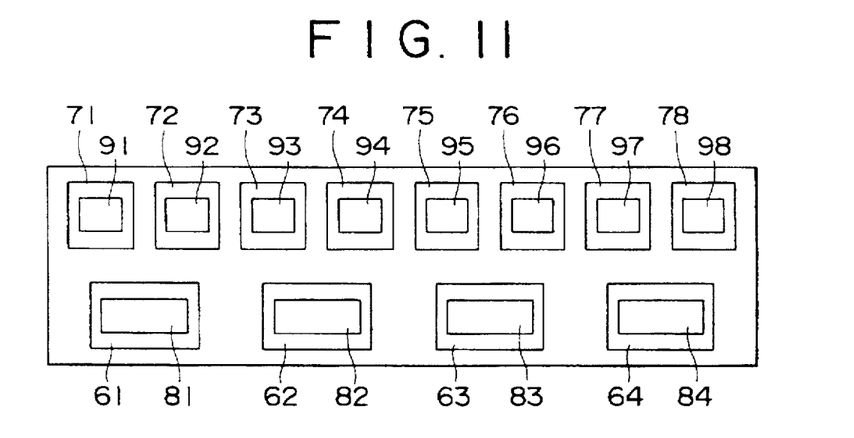
Figure 12:
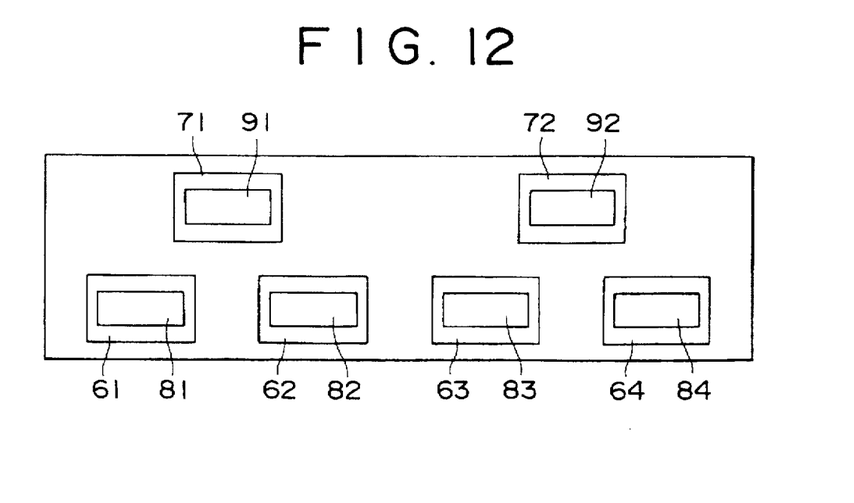

The game machine system may be modified such that, for example, four terminal equipment-connectable transmission-reception sections ;61 to 64 are provided for the repeater 40 as shown in FIGS. 10, 11 and 12 so that operation terminals 81 to 84 may be connected to the terminal equipment-connectable transmission-reception sections 61 to 64, respectively.

Referring first to FIG. 10, the modified game machine system shown includes four storage apparatus-connectable transmission-reception sections 71 to 74 as the storage apparatus-connectable transmission-reception sections of the repeater 40 such that external storage devices 91 to 94 can be connected to the storage apparatus-connectable transmission-reception sections 71 to 74, respectively. In this instance, the external storage devices 91 to 94 are provided in a one-to-one corresponding relationship to the operation terminals 81 to 84 so that individual data of the operation terminals 81 to 84 may be stored into the external storage devices 91 to 94, respectively.

Meanwhile, the modified game machine system shown in FIG. 11 includes eight storage apparatus-connectable transmission-reception sections 71 to 78 provided as the storage apparatus-connectable transmission-reception sections of the repeater 40 such that external storage devices 91 to 98 may be connected to the storage apparatus-connectable transmission-reception sections 71 to 78, respectively. In this instance, the external storage devices 91 to 98 are provided in a one-to-two corresponding relationship to the operation terminals 81 to 84 such that individual data of the operation terminal 81 may be stored into the external storage devices 91 and 92; individual data of the operation terminal 82 may be stored into the external storage devices 93 and 94; individual data of the operation terminal 83 may be stored into the external storage devices 95 and 96; and individual data of the operation terminal 84 may be stored into the external storage devices 97 and 98., Where individual external storage apparatus have a comparatively large capacity, the game machine system may be modified in such a manner as shown in FIG. 12. Referring to FIG. 12, the modified game machine system includes a pair of storage apparatus-connectable transmission-reception sections 71 and 72 provided as the storage apparatus-connectable transmission-reception sections of the repeater 40 such that a pair of external storage devices 91 and 92 may be connected to the storage apparatus-connectable transmission-reception sections 71 and 72, respectively. In this instance, the external storage devices 91 and 92 are provided in a two-to-one corresponding relationship to operation terminals 81 to 84 such that the external storage device 91 may store data of the operation terminals 81 and 82 and the external storage device 92 may store data of the operation terminals 83 and 84.

The corresponding relationship between operation terminals and external storage apparatus may be provided in place of being determined from a physical positional relationship between the terminal equipment-connectable transmission-reception sections of the repeater 40 to which the operation terminals are connected and the storage apparatus-connectable transmission-reception sections of the repeater 40 to which the external storage apparatus are connected, arbitrarily by designation of the game machine body 30.

Having now fully described the invention, it will be apparent to one of ordinary skill in the art that many changes and modifications can be made thereto without departing from the spirit and scope of the invention as set forth herein.

I claim:

1. A repeater for a game machine including a plurality of operation terminals for controlling a game, a plurality of external storage devices for storing data associated with said game, and a video/audio output device generating a plurality of vertical synchronization pulses for displaying said game, said repeater comprising:

an operation terminal section for providing transmission/reception of said data to/from the operation terminals;

an external storage section for providing transmission/reception of said data to/from the external storage devices corresponding to the operation terminals;

a game machine section for providing a serial transmission/reception of said data to/from said game machine; and a control circuit for selectively providing communication for transferring said data between said game machine section and one of said operation terminal section and external storage section such that said data is selectively transferred between said game machine and one of said plurality of operation terminals and external storage devices, said data being transferred between said game machine and each of the operation terminals between two successive vertical synchronization pulses.

2. The repeater according to claim 1, wherein the data transmission/reception to/from the operation terminals is serial.

3. The repeater according to claim 1, wherein the data transmission/reception to/from the external storage devices is serial.

4. The repeater according to claim 1, wherein said data is transferred as a group from the operation terminals to said game machine.

5. The repeater according to claim 1, wherein said game machine includes a first operation terminal section which is connected to said game machine section.

6. The repeater according to claim 1, wherein the operation terminals and external storage devices are attached to said game machine in such a way that a corresponding relationship is identified between a respective operation terminal and a corresponding external storage device.

7. The repeater according to claim 1, wherein said control circuit transfers said data between said game machine and a respective one of the external storage devices between said two successive vertical synchronization pulses.

8. A game system including a plurality of operation terminals for controlling a game, a plurality of external storage devices for storing data associated with said game, and a video/audio output device generating a plurality of vertical synchronization pulses for displaying said game, comprising:

a game machine having a first operation terminal section; and a repeater connected to said first operation terminal section for serial communication with said game machine, said repeater including:

a second operation terminal section for providing transmission/reception of said data to/from the operation terminals;

an external storage section for providing transmission/reception of said data to/from the external storage devices corresponding to the operation terminals;

a game machine section for providing serial transmission/reception of said data to/from said game machine; and a control circuit for selectively providing communication for transferring said data between said game machine section and one of said second operation terminal section and external storage section such that said data is selectively transferred between said game machine and one of said plurality of operation terminals and external storage devices, said data being transferred between said game machine and each of the operation terminals between two successive vertical synchronization pulses.

9. A repeater for a game machine including a plurality of operation terminals for controlling a game and a plurality of storage devices for storing data associated with said game, comprising:

a housing;

a plurality of operation terminal connectors located in said housing for receiving said data from respective operation terminals;

a plurality of storage device connectors located in said housing for transmitting/receiving said data to/from the storage devices corresponding to the operation terminals;

a game machine connector located in said housing for transmitting/receiving said data to/from said game machine; and a control circuit located in said housing for selectively providing communication for transferring said data between said game machine connector and one of said plurality of operation terminal connectors and storage device connectors such that said data is selectively transferred between said game machine and one of said plurality of operation terminals and storage devices.

10. The repeater according to claim 9, wherein the data transmission/reception to/from the operation terminals is serial.

11. The repeater according to claim 9, wherein the data transmission/reception to/from the storage devices is serial.

12. The repeater according to claim 9, wherein said data is transferred as a group from the operation terminals to said game machine.

13. The repeater according to claim 9, wherein said game machine includes an operation terminal connector which is connected to said game machine connector via a communications cable.

14. The repeater according to claim 9, wherein the operation terminal connectors and storage device connectors are located in said housing in such a way that a corresponding relationship is visually identifiable between a respective operation terminal and a corresponding storage device.

15. The repeater according to claim 9, further comprising a video/audio output device generating a plurality of vertical synchronization pulses for displaying said game, said control circuit transferring said data between said game machine and all of the operation terminals during each period between two successive vertical synchronization pulses.

16. The repeater according to claim 9, wherein said control circuit transfers said data between said game machine and a respective one of the external storage devices during said each period between two successive vertical synchronization pulses.

17. The repeater according to claim 9, wherein said data, received by said control circuit from said game machine connector, includes a destination code.

18. The repeater according to claim 9, wherein said data, received by said control circuit, includes a storing position in a respective storage device, said control circuit transmitting said data to a respective one of the storage device connectors.

19. The repeater according to claim 9, wherein the storage device connectors have a one-to-one correspondence with the operation terminal connectors.

* * * * *